United States Patent

Ishiguro

[15] 3,688,039

[45] Aug. 29, 1972

[54] DIGITAL SIGNAL RECEPTION SYSTEM

[72] Inventor: Tatsuo Ishiguro, Tokyo, Japan

[73] Assignee: Nippon Electric Company Limited, Tokyo, Japan

[22] Filed: Aug. 3, 1970

[21] Appl. No.: 60,671

[30] Foreign Application Priority Data

Aug. 5, 1969 Japan ......................44/62204

[52] U.S. Cl. ........................178/88, 325/41, 325/42, 325/323, 178/DIG. 3, 340/146.1

[51] Int. Cl. ............................................H04l 15/24

[58] Field of Search ......325/41, 42, 56, 323; 178/70, 178/69 G, 5.6, 5.8, DIG. 3, 88; 179/15 AE; 340/146.1

[56] References Cited

UNITED STATES PATENTS 3,372,376 3/1968 Helm.....................179/15 AE

*Primary Examiner*—Robert L. Griffin
*Assistant Examiner*—Richard P. Lange
*Attorney*—Sandoe, Hopgood and Calimafde

[57] ABSTRACT

A digital system reception signal comprises an error detection circuit for detecting an error code contained in the transmitted coded signal. Upon the detection of the error code, the received composite digital signal of the repetition period or scanning line replaces the stored coded signal of the previous repetition period.

6 Claims, 4 Drawing Figures

INVENTOR
Tatsuo Ishiguro
by
Sandoe, Hopgood & Calimafde
ATTORNEYS

DIGITAL SIGNAL RECEPTION SYSTEM

This invention relates generally to binary signal transmission systems, and more particularly to a digital signal reception system having a code error correcting function.

The number of code bits for the transmission of television phototelegraphic or facsimile signals can be decreased by utilizing differential pulse code modulation or band compression techniques. However, when a coding method of this type is employed, only one bit of code error which may be introduced in the transmission channel will affect the demodulation of the succeeding signals to thereby produce noise components appearing on the picture screen, with a resultant deterioration of the picture quality. To maintain picture quality, it is necessary to use a channel with a very small error rate. The existing channels do not always meet this requirement. The code error rate can be improved by the use of an error correction code and the picture quality can thus be improved. On the other hand, however, the transmission efficiency is lowered, because error correction bits are needed in addition to the code bits. This also lowers the coding efficiency.

It is therefore an object of this invention to provide a digital signal reception system capable of efficiently correcting the code error without lowering the code transmission efficiency.

The system of this invention is based on the fact that there is a strong line correlation in television or facsimile signals. The system is adapted to operate in such a manner that the error detection bits are added to the code bits on the transmission side, and error detection is carried out on the receiving side. If any error code is detected, the signal of the scanning line containing the error code is replaced by the signal of the immediately preceding scanning line, whereby the error code is substantially corrected.

This invention will be more fully understood from the following detailed description taken in conjunction with the accompanying drawings, wherein.

Figure 1:
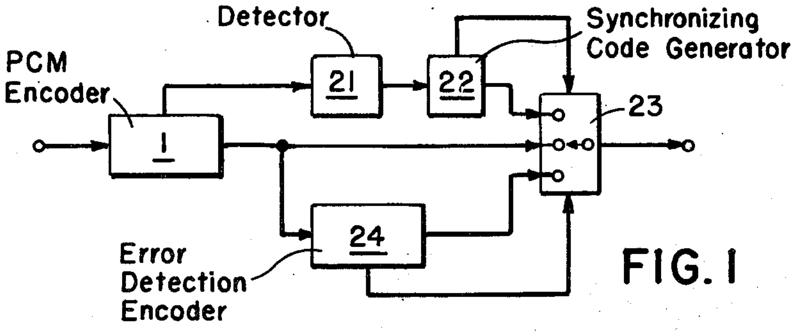
FIG. 1 is a block diagram illustrating a conventional digital signal transmission system.

Referring to FIG. 1, a composite video signal to be transmitted is converted into a digital signal by a conventional PCM encoder 1. A synchronizing signal detector 21 detects the synchronizing signal from the composite video signal. This synchronizing signal can easily be detected by using, for example, a conventional logic circuit having the function of detecting a code expressing an amplitude higher than a predetermined value such as that described below with reference to FIG. 4. A synchronizing code generator 22 coupled to the output of detector 21 generates a code of specific pattern not included in the digital signal. This specific code pattern is, for example, an all-mark code which is easily obtained by triggering a pulse generator such as a monostable multivibrator by a clock pulse train during a predetermined period. This code is a word synchronizing code for detecting the code error and is added to the digital signal via a gate circuit 23. This word synchronizing code is also to indicate the beginning of the code error detecting operation.

Figure 2:
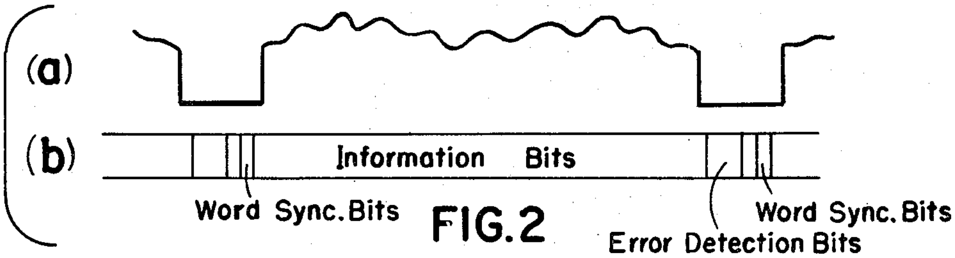
FIG. 2 is a waveform diagram showing the relationship between the video signal and the received digital signal.

FIG. 2(*a*) shows a composite video signal corresponding to nearly one scanning line; and FIG. 2(*b*) shows a code corresponding to this video signal. An error detection encoder 24 having an input coupled to PCM encoder 1 and an output coupled to gate circuit 23 generates an error detection code which is a redundancy bit code and is to be added to the end of the one word of information bits. The error detection code is derived by dividing the information bits by a predetermined polynomial, based on binary polynomial division. The error detection code is then added thereto by way of the gate circuit 23. As long as the code length during which the error detection is carried out, is determined to be a little shorter than the period corresponding to one scanning line of the video signal, and, as shown in FIG. 2(*b*), the word synchronizing code and the error detection code are inserted within the synchronizing signal period of the video signal, the information of the video signal is not lost.

Figure 3:
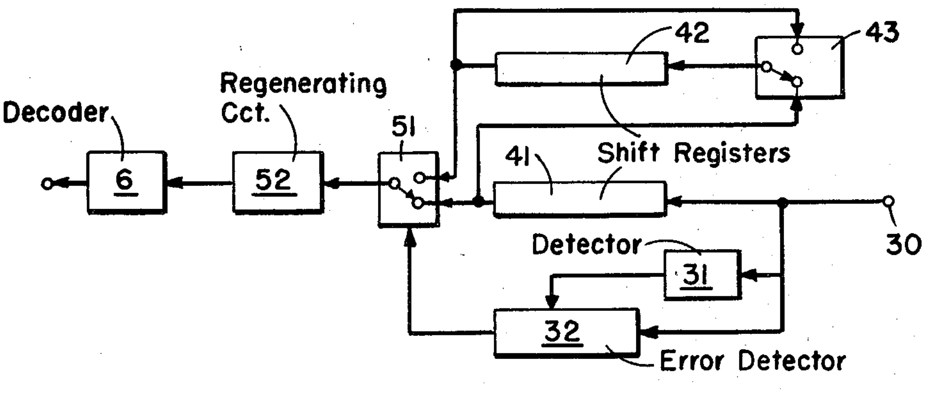
FIG. 3 is a block diagram illustrating the digital signal receiving system embodying this invention.

Referring to FIG. 3, at the receiving end, the word synchronizing code is received at a receiver input terminal 30 and is detected by a word synchronizing detector 31 coupled to terminal 30. When the word synchronizing code is detected, error detecting operation is initiated in an error detection circuit 32 coupled to the output of detector 31 and also to input terminal 30. The received composite digital signal is stored in a shift register 41, which has a number of register stages equal to that of the bits for one word corresponding to one scanning line, until the error detecting calculation is completed. When no error is detected, the output of the shift register 41 is read out by a gate circuit 51 and, at the same time, is written into another shift register 42 via a gate circuit 43. The number of stages of the shift register 42 is also equal to the bit number of one word. When one word of information is written, register 42 stops shifting and holds its state until the arrival of the next word synchronizing code. When the code error is detected, a shift pulse is applied to the shift register 42, and its content (the signal of the immediately preceding scanning line including no error) is read out via the gate circuit 51. Such replacement of the register contents does not cause any appreciable error because there is a strong correlation among the signals corresponding to the scanning lines positioned adjacent to each other. The output of the shift register is rewritten into shift register 42 via the gate circuit 43.

A synchronizing signal regenerating circuit 52 removes the word synchronizing code and redundancy bit code from the output of the gate circuit 51. The output of the regenerating circuit 52 is decoded into a video signal by a decoder 6. The removal of the word synchronizing code and the redundancy bit code is done by continuing the code in the position immediately before these codes as illustrated by the code form in FIG. 2(*b*). More specifically, the synchronizing signal regenerating circuit 52 comprises, for example, a register in which write-in and read-out operations of the input codes are performed by the use of a clock pulse train, and a gate circuit for stopping the write-in operation of the register during a predetermined period by the use of a control pulse train obtained by counting the number of the predetermined information bits from a starting point given by the word synchronizing detector 31. In this embodiment, an arbitrary format may be used for the error detection code. The detailed design and manner of operation of the conventional error detection encoder and code error detection circuit are shown in "Cyclic Codes for Error Detection" by D.T. Brown, and W.W. Peterson (Proc. IRE, vol. 49, pp.229–235 Jan., 1961); and "Error-Correcting Codes" by W.W. Peterson (M.I.T. Press and John Wiley & Sons Inc.).

Another type of shift register, delay line or the like is suited for the purpose of the register used. This invention sets no limitation on the encoding and decoding methods.

Figure 4:
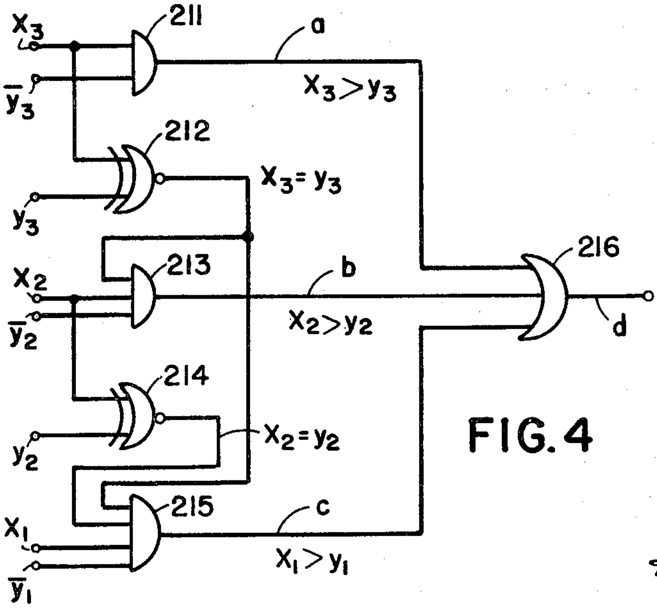
FIG. 4 is a circuit diagram of a digital circuit used in the transmission system of FIG. 1.

FIG. 4 shows an example of a conventional logic circuit for determining in the transmission system of FIG. 1, whether or not the input digital signal is greater than a predetermined digital signal, wherein it is assumed that the bit number of the digital signal is three for simplicity and the function of this circuit is $$x_3x_2x_1 > y_3y_2y_1,$$

where $x_3x_2x_1$ shows the input binary digital code, and $y_3y_2y_1$ shows the predetermined binary digital code. Numerals 211, 213 and 215 denote AND gates; 212 and 214 denote, exclusive NOR gates; and 216, an OR gate having inputs coupled to the outputs of gates 211, 213 and 215. When $y_3y_2y_1$ is "100", the relationship between $x_3x_2x_1$ and "100" is as shown in the following table where *a, b, c* and *d* are the outputs of AND gates 211, 213, 215 and OR gate 216, respectively. It is apparent from this table that output *d* holds a "1" state under the condition of $x_3x_2x_1 > 100$.

| $x_3$ | $x_2$ | $x_1$ | a | b | c | d |
|---|---|---|---|---|---|---|
| 0 | 0 | 0 | 0 | 0 | 0 | 0 |
| 0 | 0 | 1 | 0 | 0 | 0 | 0 |
| 0 | 1 | 0 | 0 | 0 | 0 | 0 |
| 0 | 1 | 1 | 0 | 0 | 0 | 0 |
| 1 | 0 | 0 | 0 | 0 | 0 | 0 |
| 1 | 0 | 1 | 0 | 0 | 1 | 1 |
| 1 | 1 | 0 | 0 | 1 | 0 | 1 |
| 1 | 1 | 1 | 0 | 1 | 0 | 1 |

Since an error detection code is used in the system according to this invention, the number of check bits can be markedly smaller than the number of bits assigned to error correction, and hence, the coding efficiency is not appreciably lowered and the decoder construction can be simplified.

What is claimed is:

1. A digital signal reception system comprising means for receiving a composite code signal having a plurality of succeeding repetition periods and including within each of said repetition periods an information code signal obtained by encoding an analog information signal within the corresponding one of said repetition periods, and an error detection code for detecting the code error caused in a transmission system coupled to said reception system; said information code signal within one of said repetition periods having a high correlation with the information code signal within the preceding one of said repetition periods; means for detecting the code error in said composite code signal; first storing means for storing a part of said composite code signal which corresponds to the code signal within at least one of said repetition periods; second storing means coupled to said first storing means for storing the output code signal of said first storing means during at least one of said repetition periods; means for reading out, every time the code error is detected, the output code signal having no code error from said second storing means; means for reading out the output code signal from said first storing means when no code error is detected; and means for converting the output code signal of said reading out means into an analog signal.

2. The digital signal reception system of claim 1, further comprising means for shifting the contents of said first storing means to said second storing means when no code error is detected.

3. The digital signal reception system of claim 1, in which said read out means further comprises gating means coupled to the outputs of said first and second storing means and to said code error detecting means.

4. The digital signal reception system of claim 3, in which said first and second storing means respectively comprises first and second shift registers, said readout means further comprising means for transferring the contents of said second shift register to said gating means upon the detection of said code error.

5. The digital reception system of claim 4, further comprising second gating means operatively interposed between said first and second shift registers and coupled to said first-mentioned gating means.

6. The digital reception system of claim 4, in which the number of stages in each of said first and second shift registers is equal to the number of bits in each of said repetition periods.

* * * * *